United States Patent [19]

Tsargorodski

[11] Patent Number: 5,762,763
[45] Date of Patent: Jun. 9, 1998

[54] METHOD AND APPARATUS FOR SEPARATING WATER FROM COMPRESSED AIR SYSTEM CONDENSATE

[75] Inventor: Mikhail Tsargorodski, Ocala, Fla.

[73] Assignee: Flair Corporation, Ocala, Fla.

[21] Appl. No.: 712,313

[22] Filed: Sep. 11, 1996

[51] Int. Cl.[6] ............................. B01D 3/00; B01D 3/10
[52] U.S. Cl. .................... 203/11; 203/12; 203/DIG. 14;
202/166; 202/176; 202/185.1; 202/205; 202/206
[58] Field of Search ................... 203/11, 12, DIG. 14; 202/166, 176, 185.1, 205, 206

[56] References Cited

U.S. PATENT DOCUMENTS

| | | | |
|---|---|---|---|
| 4,417,951 | 11/1983 | Stanisic et al. | 202/197 |
| 4,876,015 | 10/1989 | McKibben | 210/695 |
| 5,110,418 | 5/1992 | Garrison et al. | 202/81 |
| 5,132,011 | 7/1992 | Ferris | 210/180 |
| 5,302,300 | 4/1994 | Porri | 210/774 |
| 5,536,375 | 7/1996 | Vogelman | 203/2 |

OTHER PUBLICATIONS

P&H Systems, Inc. brochure entitled "the Depolluter", pp. 1–7, Jul. 20, 1991.

Primary Examiner—Nina Bhat
Attorney, Agent, or Firm—Kennedy Covington Lobdell & Hickman, LLP

[57] ABSTRACT

A method and apparatus for separating water from a condensate mixture having two or more components drained from a compressed gas system is disclosed. The apparatus has a boiler with an inlet for receiving the condensate mixture and an outlet through which water vapor is removed. The boiler is maintained at sufficient negative pressure to lower the boiling point of the water in the condensate mixture and to enable the water in the boiler to boil at a lower temperature than if the negative pressure were not present. Heat is provided to the boiler to raise the temperature of the condensate mixture to equal or exceed that of the boiling point of the water in the negative pressure environment, but below the boiling point of the remaining components in the condensate mixture.

24 Claims, 2 Drawing Sheets

METHOD AND APPARATUS FOR SEPARATING WATER FROM COMPRESSED AIR SYSTEM CONDENSATE

BACKGROUND OF THE INVENTION

The present invention relates to compressed gas systems and, more particularly, to a method and apparatus for removing water from a liquid condensate mixture drained from such a compressed gas system.

Compressed gas systems are used to provide compressed gas, such as air, to a variety of applications. Typically, the source of air for the compressed air system is ambient air, which contains water and other vapors, and often some entrained liquid and other contaminants. The compression and subsequent cooling of this air results in the condensation of many of the vapors contained therein. In many compressed air applications, the presence of moisture is undesirable and may damage equipment. It is desirable to provide compressed air to its end use that is as dry as possible, to minimize any damage to equipment utilizing compressed air from any moisture contained therein.

Also, compressed air system components, notably the compressor, utilize lubricant and cooling fluid that often contain hydrocarbon-based oils. Some of these oils may find their way into the compressed air stream.

Typically, compressed air systems employ moisture separators, air dryers, or the like to condense and remove water and other vapors and entrained liquids from the compressed air system. When the water and other vapors are condensed from the compressed air, they are generally collected in a tank or other container for collecting the drained condensate. Into this tank also drains any other liquids that may be contained in the compressed air stream, such as the oils discussed above. The condensate mixture in this tank must be recycled, used in another process, or disposed of properly.

While past practice has often been to simply dispose of the entire contents of the tank, the presence of any oils or other hydrocarbons within the tank generally necessitates treating the contents of the tank as hazardous material. Generally, hazardous material is expensive to dispose of, and the costs associated with disposal are usually based upon volume or weight of the material to be disposed of in this manner. The presence of water in this material can substantially increase its weight, so a large percentage of water therein will significantly increase the cost associated with its disposal. It is unnecessary to dispose of pure water as part of any hazardous material, and, therefore, it is desirable to remove as much water as possible from this condensate mixture.

If some or all of the components of the condensate mixture are to be reused or recycled, they first must be separated into their constituent components in order to reuse or recycle them. For example, water that is present in this condensate mixture may be used in another application to reduce water costs. Also, there are processes available for reusing or recycling hydrocarbon-based oils so that this material is not wasted. One such application is use as low-grade fuel for furnaces or boilers. Thus, it is also desirable to separate the water and other components from the condensate mixture for possible reuse or recycling.

Current methods for separating the oil and water from the condensate mixture include gravity separation, coalescing filters, membrane filters, activated carbon filters, distillation, or some combination thereof. For example, Poori U.S. Pat. No. 5,302,300 discloses an apparatus that collects a mixture of water and lubricant that has been condensed from a compressed air system into a vessel, then heats this liquid mixture within the vessel to vaporize the water. The water vapor is vented to the atmosphere and the lubricant remains within the vessel, to be drained therefrom. The water is vaporized by use of a heat exchanger disposed in the vessel through which hot oil, used to cool the compressor in the compressed air system, flows continuously. Generally, this oil is around 200° F., which is not hot enough to efficiently vaporize or boil the water component of the mixture. Thus, this system relies significantly on evaporation of water, and not boiling the water from the mixture. The inefficient evaporation is exacerbated because the oil, which tends to separate from the water, forms a film on top of the water which decreases the vaporization rate of the water.

Thus, it is desirable to provide a method and apparatus for removing liquid water from a condensate mixture drained from such a compressed gas system which overcomes or ameliorates the disadvantages of known technology in this area.

SUMMARY OF THE INVENTION

It is an object of the present invention to provide a method and apparatus for separating liquid water from a condensate mixture at a temperature below that of the normal boiling point of water, such as with heat that can be provided from the cooling fluid of a compressor in a compressed air system. It is a further object of the present invention to provide for better heat transfer from the heat transfer fluid to the condensate mixture in order to more efficiently remove the water from the condensate mixture and to minimize the size and cost of the required equipment. It is yet a further object of the present invention to provide a system for capturing the water separated from the condensate mixture, which can be reused or recycled.

Briefly summarized, the present invention provides a method and apparatus for separating water from a condensate mixture having two or more components with different boiling points that is drained from a compressed gas system. The apparatus includes a boiler, for boiling the water from the condensate mixture, with an inlet conduit for receiving the condensate mixture from the compressed gas system and an outlet conduit through which the water vapor is removed from the boiler. The boiler also has a drain conduit to remove accumulated unvaporized components therefrom at predetermined intervals. The boiler is maintained at a negative pressure to lower the boiling point of the water in the condensate mixture and to enable the water in the boiler to boil at a lower temperature than if the negative pressure were not present.

The apparatus also includes a condenser connected to the boiler outlet conduit to receive water vapor removed from the boiler and to condense the removed water vapor, and includes a collecting tank for receiving the liquid water condensed by the condenser. A vacuum ejector adapted to be connected to a source of compressed gas and having a compressed gas inlet conduit and a compressed gas outlet conduit may be connected to the collecting tank for creating and maintaining negative pressure in the collecting tank. The collecting tank is in open communication with the condenser and the boiler so that the negative pressure is communicated to the condenser and the boiler through the collecting tank.

Preferably, the compressed gas system has a compressor with a cooling fluid to absorb heat from and cool the compressor. This cooling fluid flows in a closed flow path from the compressor through the boiler to transfer heat to the condensate mixture within the boiler, thus raising the temperature of the condensate mixture to the boiling point of the water in the negative pressure environment and below the boiling point of the remaining components in the condensate mixture. This boils the water within the condensate without boiling any of the other components therein.

The boiler inlet conduit is provided with a first solenoid-operated valve that controls the flow of the condensate mixture from the compressed gas system to the boiler. A float switch is disposed at a predetermined location within the boiler and is operatively connected to the first solenoid-operated valve to close the valve when the level of condensate mixture within the boiler reaches the predetermined location. A second solenoid-operated valve is disposed between the collecting tank and the vacuum ejector, and is operatively associated with a pressure sensor in communication with the boiler, to close the connection between the collecting tank and the vacuum ejector when a predetermined negative pressure in the boiler is reached.

The apparatus also has a third solenoid-operated valve disposed in the compressed gas outlet of the vacuum ejector which operates to start and stop the flow of compressed gas through the vacuum ejector. This valve is also closed at predetermined times to redirect compressed gas into the collecting tank to pressurize the collecting tank, thus forcing the contents thereof to be evacuated.

The invention also includes a method for separating a first component with a first boiling point, such as water, from a liquid mixture having at least one other component, such as lubricant, with the other components having higher boiling points than the first component. This includes providing a source of the mixture, such as the condensate from a compressed gas system, and establishing and maintaining negative pressure in a boiler, with the negative pressure creating a pressure differential that causes the mixture to flow from the source into the boiler through an inlet conduit having a valve. The mixture is then collected in the boiler until it reaches a predetermined level within a predetermined collecting time, at which point the boiler inlet valve is closed. The temperature of the mixture within the boiler is raised to boil the first component within the mixture, without reaching the boiling points of the other components in the mixture. The temperature at which the first component boils is significantly reduced by the existence of negative pressure in the boiler.

The vaporized first component is then aspirated from the boiler into a condenser and condensed into a liquid that is accumulated in a collecting tank and periodically evacuated either after a predetermined accumulation time or based on liquid level in the collecting tank by pressurizing the collecting tank. After a predetermined boil-down time, the boiler inlet valve is opened to resume collecting the mixture into the boiler. Then the steps outlined above are repeated, until the level of the mixture in the boiler does not reach the predetermined level within the predetermined collecting time, in which case the boiler inlet valve is closed again, the first component is boiled, as described above, and the system is shut down and the negative pressure allowed to release for a predetermined wait time, after which the process begins again by establishing and maintaining negative pressure in the boiler, and progressing through the steps described above.

DETAILED DESCRIPTION OF THE PREFERRED EMBODIMENT

The present invention provides a method and apparatus 10 for separating a liquid with a first boiling point from a liquid mixture, with the remaining components of the mixture having higher boiling points than that of the first liquid component. While it is to be recognized that the invention may be applied to separate a wide variety of liquids from a wide variety of mixtures, the invention will be detailed with respect to separating water from a condensate mixture having two or more components drained from a compressed gas system, represented in FIG. 1 by numeral 12, which preferably is a compressed air system.

Figure 1:
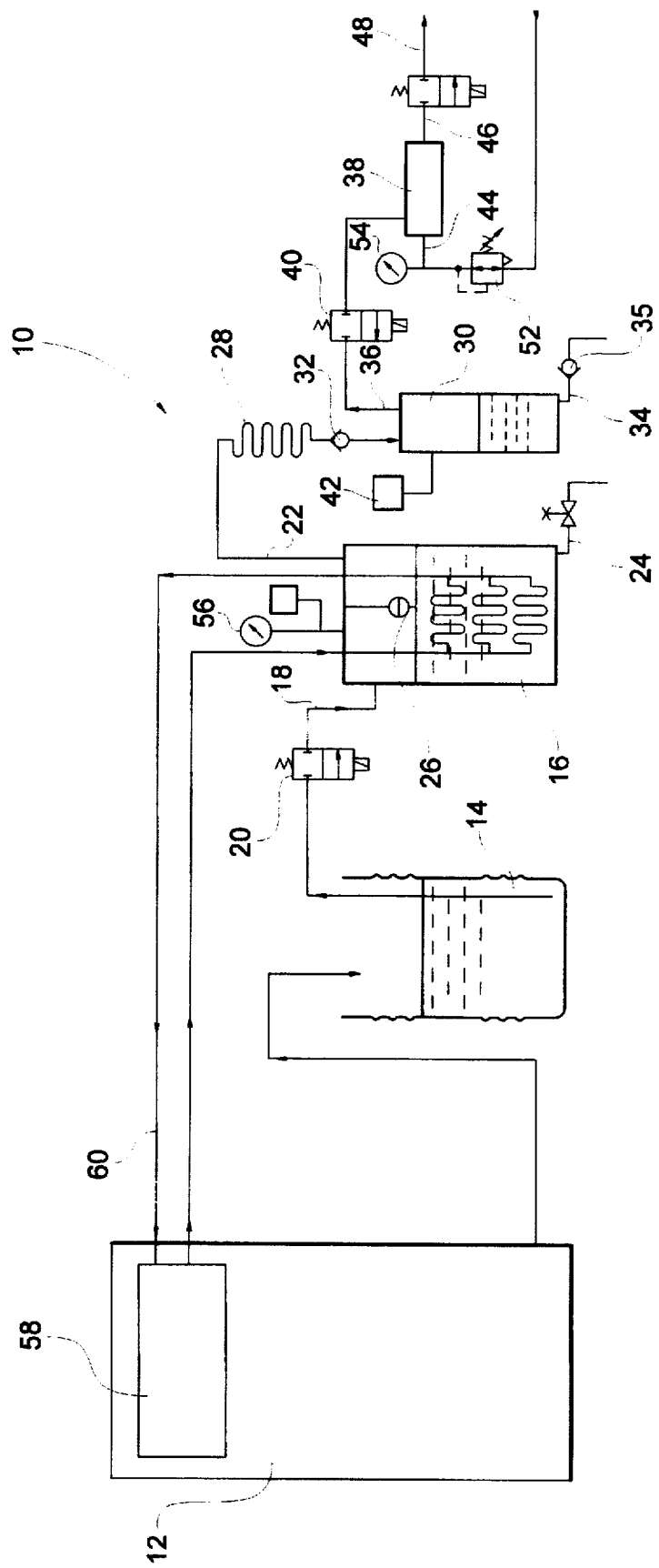
FIG. 1 is a schematic representation of the preferred embodiment of the present invention.

As best seen in FIG. 1, a mixture of liquid, including the water condensed in the compressed air system 12, is drained into a condensate tank 14. Such condensate mixture generally includes water condensed from the water vapor within the air as it is compressed and subsequently cooled, and includes oil and other lubricants used to lubricate and cool the components within the compressed air system 12, as well as other components condensed from vapor within the compressed air stream. This condensate mixture is collected and drained from an aftercooler, low point drains, and other locations within the compressed air system (not shown).

A boiler 16 has an inlet conduit 18 which is operatively connected to the condensate tank 14 so that the condensate mixture may flow to the boiler 16, and a first solenoid-operated valve 20 is disposed in the boiler inlet conduit 18 to control the flow of the condensate mixture from the condensate tank 14 to the boiler 16. The boiler 16 acts to boil the water therein and has an outlet conduit 22 for aspiration of the water vapor after the water is boiled within the boiler 16. The boiler 16 also has a drain conduit 24 for periodically draining any accumulated unvaporized liquid. A liquid level sensor 26, preferably a float switch, is disposed within the boiler 16 at a predetermined location above the bottom of the boiler 16 and is operatively associated with the first solenoid-operated valve 20 to close the first solenoid-operated valve 20 when the level of the condensate mixture within the boiler 16 rises to the predetermined location.

A condenser 28 is connected to the boiler outlet conduit 22 for condensing the aspirated water vapor, and a collecting tank 30 is disposed to receive such condensed water vapor. A first one-way check valve 32 is located between the condenser 28 and the collecting tank 30, allowing flow of fluid only from the condenser 28 to the collecting tank 30, and not in the reverse direction. The collecting tank 30 is provided with a drain conduit 34 to allow the contents thereof to be evacuated, and a second one-way check valve 35 that only enables flow of fluid out of the collecting tank 30 and not into the collecting tank 30 through the drain conduit 34.

A vacuum line 36 connects the collecting tank 30 to a conventional vacuum ejector 38 for creating a vacuum within the collecting tank 30. A second solenoid-operated valve 40 is disposed within the vacuum line 36 and is operatively associated with a pressure sensor 42 that is in communication with the collecting tank 30 for sensing the pressure therein. The second solenoid-operated valve 40 opens and closes the vacuum line 36 in response to a signal received from a controller 50 based on the pressure sensed by the pressure sensor 42, as will be described in greater detail presently.

The vacuum ejector 38 is adapted to be connected to any convenient source of compressed air (not shown), and has a compressed air inlet conduit 44 and a compressed air outlet conduit 46. The source of compressed air may be, but need not be, the compressed air system from which the condensate mixture is drained. The vacuum ejector 38 is connected to the collecting tank 30 via the vacuum line 36 for creating and maintaining a negative pressure in the collecting tank 30, and the collecting tank 30 is in open communication with the condenser 28 and the boiler 16 so that such negative pressure is also created and maintained in the condenser 28 and the boiler 16. The negative pressure that is created and maintained is sufficient to lower the boiling point of the water in the condensate mixture in the boiler 16 and to enable this water to boil at a lower temperature than if the negative pressure were not present.

A third solenoid-operated valve 48 is located in the vacuum ejector compressed air outlet conduit 46 and is operatively associated with the pressure sensor 42 for controlling the flow of compressed air through the vacuum ejector 38. Further, the third solenoid-operated valve 48 is selectively operable to a closed position at which compressed air is redirected from the vacuum ejector 38 into the collecting tank 30 to pressurize the collecting tank 30 and force the contents thereof to be evacuated through the collecting tank drain conduit 34.

The second one-way check valve 35 is designed to allow the contents of the collecting tank 30 to be evacuated through collecting tank drain conduit 34 when the collecting tank 30 is pressurized to a pressure greater than that on the other side of the second one-way check valve 35, normally atmospheric pressure. When negative pressure is present in the collecting tank 30, the second one-way check valve 35 prevents flow into the collecting tank 30 from the drain conduit 34. First one-way check valve 32 allows passage of fluid from the condenser to the collecting tank 30. When collecting tank 30 is pressurized with compressed air, the first one-way check valve 32 prevents passage of that compressed air into the condenser 28 and the boiler 16.

Figure 2:
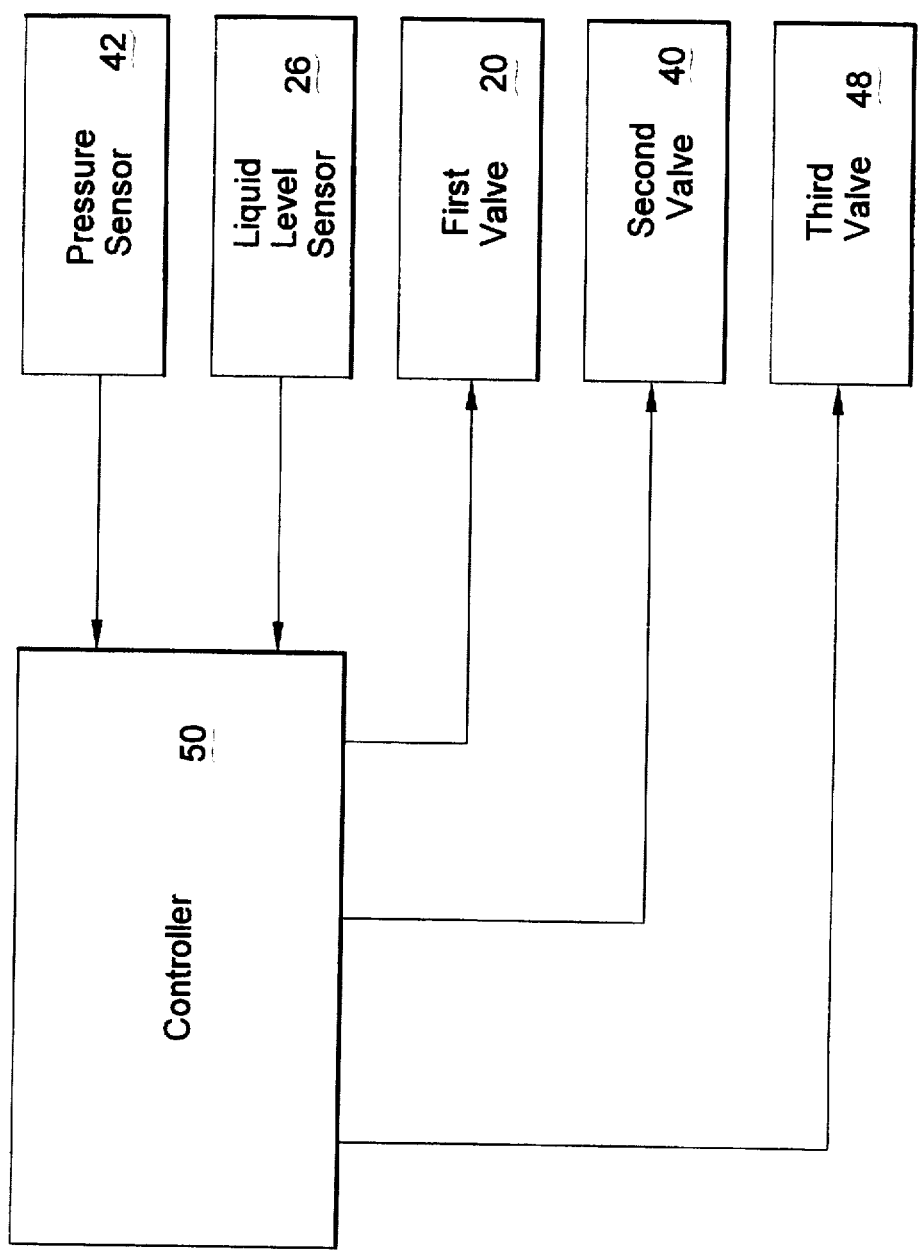
FIG. 2 is a schematic representation of the input and output signals to and from the controller of the present invention.

As is schematically illustrated in FIG. 2, the controller 50, which preferably is a conventional microprocessor, receives signals generated by the liquid level sensor 26 and the pressure sensor 42 and sends signals to operate the first solenoid-operated valve 20, the second solenoid-operated valve 40, and the third solenoid-operated valve 48, as will be described in greater detail below.

As illustrated in FIG. 1, the vacuum ejector compressed air inlet conduit 44 is provided with a pressure regulator 52 to control the pressure of the compressed air entering the vacuum ejector 38, and is also provided with a pressure gauge 54 to monitor this pressure. A boiler pressure gauge 56 is provided in communication with the boiler 16 in order to monitor the pressure therein.

The compressed air system 12 is generally provided with a compressor 58 to compress the air therein. Typically, the compressor is provided with a coolant that absorbs heat from and cools the compressor 58. In a preferred embodiment, the compressor coolant is continuously circulated through conduit 60 in a closed flow path into the boiler 16 to transfer heat to the condensate mixture within the boiler 16 and raise the temperature of the condensate mixture to a temperature that is sufficient to boil the water in the condensate mixture and that is below the boiling point of the remaining components of the condensate mixture. In a preferred embodiment, the compressor 58 is an oil-flooded rotary-screw compressor.

In operation, the apparatus 10 is started up by the controller 50 opening all three solenoid-operated valves 20,40, 48. Opening the third solenoid-operated valve 48 initiates the flow of compressed air through the vacuum ejector 38 which creates a negative pressure in the vacuum line 36. When the second solenoid-operated valve 40 is opened, the negative pressure is communicated to the collecting tank 30, and, because the collecting tank 30 is in open communication with the condenser 28 and the boiler 16, this negative pressure will also be created in the condenser 28 and the boiler 16. Since the boiler is being maintained at a negative pressure less than the atmospheric pressure in the condensate tank 14, opening the first solenoid-operated valve 20 will serve to draw condensate mixture from the condensate tank 14 into the boiler 16.

If within about fifteen minutes the boiler 16 becomes full, the float switch 26 generates a signal that is transmitted to the controller 50 which then causes the first solenoid-operated valve 20 to be closed for a period of about sixty minutes. The condensate mixture within the boiler 16 then absorbs heat from the compressor coolant circulating through the conduit 60, and the water contained within the condensate mixture boils and is aspirated through the boiler outlet conduit 22 and flows into the condenser 28, where it is condensed and collected in the collecting tank 30. After about twenty minutes, or if the liquid level in the collecting tank 30 reaches a predetermined level as measured by the liquid level sensor 42, the third solenoid-operated valve 48 is closed by the controller 50 to redirect the compressed air entering the compressed air inlet conduit 44 into the vacuum line 36 and into the collecting tank 30, thus pressurizing the collecting tank 30.

When the pressure in the collecting tank 30 is greater than the pressure downstream of the second one-way check valve 35, which is generally at atmospheric pressure, the contents of the collecting tank 30 are evacuated through the collecting tank drain conduit 34. After about ten seconds, the third solenoid-operated valve 48 is reopened by the controller 50, once again establishing negative pressure in the vacuum Line 36 and the collecting tank 30. This process repeats itself for approximately sixty minutes in three twenty-minute cycles, after which the first solenoid-operated valve 20 is reopened by the controller 50, causing the condensate mixture from within the condensate tank 14 to flow into the boiler 16.

If within about two minutes after re-opening the first solenoid-operated valve 20, the boiler 16 becomes full, as sensed by the float switch 26, then the controller 50 causes the above-described sixty-minute cycle to be repeated, purging the collecting tank about every twenty minutes. If the boiler 16 does not fill within about two minutes after re-opening the first solenoid-operated valve 20, or within fifteen minutes after opening valve 20 on startup, then the controller 50 causes the first solenoid-operated valve 20 to close and the condensate mixture within the boiler 16 undergoes a 120-minute cycle as described above for the sixty-minute cycle, wherein the collecting tank is purged about every twenty minutes (i.e., six twenty-minute cycles). At the end of the two hours, valve 20 is opened and valves 40,48 are closed by the controller 50 and the apparatus 10 shuts down and goes into standby mode for about ten hours wherein the negative pressure slowly releases through valve 20 to the atmosphere. After about ten hours of standby, the cycle repeats itself by starting up the apparatus 10.

Because the temperature of any residual accumulated unvaporized components in the boiler 16 may be elevated due to the continuous flow of compressor coolant through the boiler 16, care must be taken when initially creating the vacuum after standby to avoid vigorous boiling, or flushing, of the condensate mixture which could create aerosol carryover into the condenser. For example, the vacuum may be created slowly by cycling valves 40,48 open for about fifteen seconds and closed for about forty-five seconds until the desired vacuum is attained.

Periodically, the boiler is drained through drain conduit 24 to remove accumulated unvaporized components, such as oil and other hydrocarbon residuals.

One of the features of the present invention is that creation and maintenance of negative pressure within the boiler allows the water to boil at a lower temperature than if a negative pressure is not present. Typically, the compressor coolant is at about 200° F., and, by providing negative pressure within the boiler to reduce the boiling point of the water within the condensate mixture to less than about 200° F., preferably to about 150° F., the heat provided by the compressor coolant may more efficiently boil the water from within the condensate mixture. Both the greater temperature difference and agitation caused by the boiling dramatically improve the heat transfer between the compressor coolant and the water within the condensate mixture, thus reducing the required heat exchange surface area, physical size, and cost of the assembly when compared with operation at normal atmospheric pressure. This also enables the equipment used to be sized much smaller, or provides an increase in the removal rate of the water from the condensate mixture for the same sized equipment that utilizes normal atmospheric pressure.

Further, the heat provided by the compressor coolant in a system that is at atmospheric pressure typically is insufficient to boil the water in the condensate mixture; it simply aids evaporation which is impeded by the presence of a surface film of oil in the boiler. By utilizing a negative pressure to lower the boiling point of the water, the water boils, instead of merely evaporating, and the presence of the oil film does not significantly impede the vaporization of the water.

Another feature of the present invention is that the pressure sensor 42 is operatively connected to the second solenoid-operated valve 40 and the third solenoid-operated valve 48, such that, when the negative pressure within the collecting tank 30 reaches a predetermined value, the signal from the pressure sensor 42 causes the controller 50 to shut the second and third solenoid operated valves 40,48 to conserve use of compressed air through the vacuum ejector 38 and to control the amount of negative pressure within the apparatus 10 between predetermined pressure values. Generally, it is desirable to maintain negative pressure of between about 22 and 25 inches Hg (about five to eight inches Hg absolute), but negative pressures up to and including about 27 inches Hg (about three inches Hg absolute) are possible and useful. When the negative pressure within the boiler 16 is not between the aforesaid predetermined pressure values, then the signal from the pressure sensor 42 causes the controller 50 to open the second and third valves 40,48 to maintain the vacuum in the boiler 16 through the condenser 28, the collecting tank 30, and the vacuum line 36. In a preferred embodiment, the compressed air used in the vacuum ejector 38 is the same compressed air created in the compressed air system 12. This produces cost savings and maximizes efficient utilization of available resources.

It will therefore be readily understood by those persons skilled in the art that the present invention is susceptible of a broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

I claim:

1. A method for separating water from a liquid condensate mixture formed in a compressed gas system resulting from compression of gas containing water vapor and other vapors and entrained liquids by a compressor, comprising the steps of:
   a. removing said condensate mixture from said compressed gas system;
   b. collecting said drained condensate mixture in a boiler;
   c. maintaining said boiler at negative pressure while raising the temperature of said condensate mixture within said boiler to boil only the water within said condensate mixture into water vapor; and
   d. removing said water vapor from said boiler.

2. The method of claim 1, wherein said step of maintaining said boiler at a negative pressure includes passing compressed gas through a vacuum ejector operatively connected with said boiler.

3. The method of claim 2, wherein the step of removing said water vapor from said boiler includes aspirating said water vapor into a condenser, condensing said water vapor, and collecting said condensed liquid water in a collecting tank.

4. The method of claim 3, wherein the step of maintaining said boiler at negative pressure includes creating said negative pressure in said collecting tank using said vacuum ejector with said collecting tank being in open communication with said condenser and said boiler.

5. The method of claim 3, further comprising the step of draining said condensed liquid water from said collecting tank.

6. The method of claim 5, wherein the step of draining said collecting tank includes pressurizing said collecting tank by redirecting said compressed gas from said vacuum ejector into said collecting tank, to (create sufficient pressure to discharge the condensed liquid water from said collecting tank.

7. The method of claim 1, wherein said step of raising the temperature of said condensate mixture within said boiler includes continuously circulating a fluid in a flow path passing through said compressor to cool said compressor and then through said boiler to heat said condensate mixture.

8. A method for separating a first component with a first boiling point from a liquid mixture having at least one other component, said at least one other component having a higher boiling point, comprising the steps of:
   a. providing a source of said mixture;
   b. establishing and maintaining negative pressure in a boiler, said negative pressure creating a pressure differential causing said mixture to flow from said source into said boiler through an inlet having a valve;

c. collecting said mixture in said boiler until the level of said mixture in said boiler reaches a predetermined level within a predetermined collecting time, and then closing said inlet valve;

d. raising the temperature of said mixture within said boiler to boil the first component within said mixture into a vapor;

e. aspirating said first component vapor from said boiler into a condenser and condensing said first component vapor into liquid first component;

f. accumulating said condensed liquid first component in a collecting tank and periodically pressurizing said collecting tank to evacuate liquid first component from said collecting tank by pressurizing said collecting tank;

g. opening said inlet valve after a predetermined time to resume collecting said mixture into said boiler;

h. repeating steps c through g, above, until the level of said mixture in said boiler fails to reach said predetermined level within said predetermined collecting time;

i. closing said inlet valve and repeating steps d through f, and allowing said negative pressure to be released for a predetermined wait time, then repeating steps a through h, above.

9. A method for separating water from a liquid condensate mixture formed in a (compressed gas system resulting from the compression of gas containing water vapor and other vapors and entrained liquids, comprising the steps of:

a. removing said condensate mixture from said compressed gas system;

b. establishing and maintaining negative pressure in a boiler, said negative pressure creating a pressure differential causing said condensate mixture to flow into said boiler through an inlet having a valve;

c. collecting said drained condensate mixture in said boiler until the level of said condensate mixture in said boiler reaches a predetermined level within a predetermined collecting time, and then closing said inlet valve;

d. raising the temperature of said condensate mixture within said boiler to boil the water within said condensate mixture into water vapor;

e. aspirating said water vapor from said boiler into a condenser and condensing said water vapor into liquid water;

f. accumulating said condensed liquid water in a collecting tank and periodically pressurizing said collecting tank to evacuate liquid water from said collecting tank by pressurizing said collecting tank;

g. opening said inlet valve after a predetermined time to resume collecting said drained condensate mixture into said boiler;

h. repeating steps c through g, above, until the level of said condensate mixture in said boiler fails to reach said predetermined level within said predetermined collecting time;

i. closing said inlet valve and repeating steps d through f, and allowing said negative pressure to be released for a predetermined wait time, then repeating steps a through h, above.

10. An apparatus for separating water from a condensate mixture having two or more components drained from a compressed gas system, comprising a boiler for boiling the water in said condensate mixture into a vapor, said boiler having an inlet for receiving said condensate mixture from the compressed gas system, an outlet through which the water vapor is removed from said boiler, and means for maintaining said boiler at a sufficient negative pressure to lower the boiling point of the water in said condensate mixture and to enable the water in said boiler to boil at a lower temperature than if the negative pressure were not present.

11. The apparatus of claim 10, wherein said means for maintaining said negative pressure in said boiler includes a vacuum ejector operatively connected to said boiler.

12. The apparatus of claim 11, wherein said vacuum ejector is operated by compressed gas from the compressed gas system from which the condensate mixture is drained.

13. The apparatus of claim 10, further comprising a condenser connected to said boiler outlet for condensing said removed water vapor.

14. The apparatus of claim 13, further comprising a collecting tank for receiving the liquid water condensed by said condenser.

15. The apparatus of claim 14, further comprising a vacuum ejector adapted to be connected to a source of compressed gas, said vacuum ejector being connected to said collecting tank for creating and maintaining negative pressure in said collecting tank, said collecting tank being in open communication with said condenser and said boiler so that the negative pressure is transmitted therethrough to said condenser and said boiler.

16. The apparatus of claim 10, in which said compressed gas system includes a compressor and cooling fluid to absorb heat from and cool said compressor, said apparatus including means for circulating said cooling fluid in a flow path from said compressor through said boiler to transfer heat to said condensate mixture within said boiler to raise the temperature of said condensate mixture to a temperature that is sufficient to boil the water in said condensate mixture and that is below the boiling point of the remaining components of said condensate mixture.

17. An apparatus for separating water from a condensate mixture that is drained from a compressed air system in which air is compressed by a compressor, comprising:

a. a boiler for boiling the water in said condensate mixture into a vapor, said boiler having an inlet for receiving said condensate mixture from the compressed gas system and an outlet through which said water vapor is removed from said boiler;

b. a condenser connected to said boiler outlet for condensing said removed water vapor;

c.) a collecting tank for receiving the liquid water condensed by said condenser, and d. a vacuum ejector adapted to be connected to a source of compressed air and having a compressed air inlet and a compressed air outlet, said vacuum ejector being connected to said collecting tank for creating and maintaining a negative pressure in said collecting tank, said collecting tank being in open communication with said condenser and said boiler so that said negative pressure is also created and maintained in said condenser and said boiler through said collecting tank, said negative pressure being sufficient to lower the boiling point of the water in said condensate mixture and to enable the water in said boiler to boil at a lower temperature than if the negative pressure were not present.

18. The apparatus of claim 17, in which said compressed air system includes cooling fluid to absorb heat from and cool said compressor, said apparatus including means for circulating said cooling fluid through said boiler to transfer heat to said condensate mixture within said boiler to raise the temperature of said condensate mixture to a temperature that is sufficient to boil the water in said condensate mixture and that is below the boiling point of the remaining components of said condensate mixture.

19. The apparatus of claim 17, further comprising a first valve disposed in sail boiler inlet for controlling the flow of said condensate mixture from said compressed air system.

20. The apparatus of claim 19, further comprising a liquid level sensor disposed at a predetermined location within said boiler, said liquid level sensor operatively connected to said first valve to close said first valve when the level of condensate mixture within said boiler reaches said predetermined location.

21. The apparatus of claim 17, further comprising pressure sensing means connected to said collecting tank for sensing pressure within said collecting tank, and a second valve disposed between said collecting tank and said vacuum ejector, said second valve operatively connected to said pressure sensing means to disconnect said collecting tank and said vacuum ejector when a predetermined negative pressure in said collecting tank is reached.

22. The apparatus of claim 17, further comprising a third valve disposed in said compressed air outlet of said vacuum ejector for controlling the flow of compressed air through said vacuum ejector, said third valve being selectively operable to a closed position at which compressed air is redirected into said collecting tank to pressurize said collecting tank and force the contents thereof to be evacuated.

23. The apparatus of claim 17, wherein said boiler includes drain means to remove accumulated unvaporized components therefrom at predetermined intervals.

24. An apparatus for separating water from a condensate mixture that is drained from a compressed air system, comprising:

a. a condensate tank for collecting said condensate mixture drained from the compressed air system;

b. a boiler connected to said condensate tank for boiling the water in said condensate mixture into a vapor, said boiler having an inlet for receiving said condensate mixture from said condensate tank, and an outlet for aspiration of water vapor;

c. a first valve disposed in said boiler inlet to control the flow of condensate mixture from said condensate tank to said boiler;

d. a liquid level sensor disposed within said boiler at a predetermined location above the bottom of said boiler and operatively associated with said first valve to close said first valve when the level of said condensate mixture within said boiler rises to said predetermined location;

e. a condenser connected to said boiler outlet for condensing the aspirated water vapor;

f. a collecting tank for receiving the liquid water condensed by said condenser, said collecting tank having a vacuum line connection connected to a vacuum line;

g. a pressure sensor connected to said collecting tank for sensing the pressure therein, and a second valve located in said vacuum line and operatively associated with said pressure sensor for opening and closing said vacuum line;

h. a vacuum ejector adapted to be connected to a source of compressed air and having a compressed air inlet and a compressed air outlet, said vacuum ejector being connected to said collecting tank via said vacuum line for creating and maintaining a negative pressure in said collecting tank, said collecting tank being in open communication with said condenser and said boiler so that said negative pressure is also created and maintained in said condenser and said boiler through said collecting tank, said negative pressure being sufficient to lower the boiling point of the water in said condensate mixture and to enable the water in said boiler to boil at a lower temperature than if the negative pressure were not present;

i. a third valve disposed in said compressed air outlet of said vacuum ejector and operatively associated with said pressure sensor for controlling the flow of compressed air through said vacuum ejector, said third valve being selectively operable to a closed position at which compressed air is redirected into said collecting tank to pressurize said collecting tank and force the contents thereof to be evacuated; and j. control means for operating said first, second, and third solenoid valves in response to signals generated by said liquid level sensor and said pressure sensor, and at said predetermined times.

* * * * *